United States Patent [19]

Burg

[11] 4,271,925
[45] Jun. 9, 1981

[54] FLUID ACTUATED ACOUSTIC PULSE GENERATOR

[76] Inventor: Kenneth E. Burg, 4505 Bordeaux, Dallas, Tex. 75205

[21] Appl. No.: 42,917

[22] Filed: May 29, 1979

[51] Int. Cl.$^3$ .................... G01V 1/133; G01V 1/38
[52] U.S. Cl. .................................. 181/120; 181/106; 181/119; 367/142
[58] Field of Search ............... 181/106, 110, 119, 120; 367/142; 175/297; 166/177, 249

[56] References Cited

U.S. PATENT DOCUMENTS

| 2,281,751 | 5/1942 | Cloud ................................ 181/106 |
| 2,424,108 | 7/1947 | Merten ............................. 181/106 |
| 2,759,143 | 8/1956 | Arps .................................. 367/85 |
| 3,376,949 | 4/1968 | Baker et al. ...................... 181/120 |
| 3,536,157 | 10/1970 | Anstry ............................. 181/120 |
| 3,690,403 | 9/1972 | Davis ................................ 181/120 |
| 3,721,311 | 3/1973 | Mott-Smith ..................... 181/119 |
| 3,863,203 | 1/1975 | Patton et al. .................... 367/85 |
| 3,979,140 | 9/1976 | Silverman et al. ............... 181/120 |
| 4,008,784 | 2/1977 | Bays ................................. 181/114 |
| 4,078,632 | 3/1978 | Horsman .......................... 181/114 |

FOREIGN PATENT DOCUMENTS

| 1117983 | 5/1956 | France .......................... 181/120 |
| 2376422 | 12/1976 | France .......................... 181/119 |

OTHER PUBLICATIONS

Davis, "The Transient Character . . . Waterhammer . . . ", 4/24/70, pp. 619-634, O.T.C., vol 1, TC 1505/oc, G-222.
Thorley, "Pressure Transient in Hydraulic Pipelines", 12/68, Paper 68-WA/FE2, ASME Winter Meeting.
Junger, "Theory and Design of an End Fire . . . Source", 9/21/54, pp. 1-67, NR-014-903, Technical Memo, No. 34.
Davis, "A Study of the Spectral . . . Diaphragm", 4/9/69, p. 191, Thesis, Southern Methodist Univ.

*Primary Examiner*—Nelson Moskowitz
*Attorney, Agent, or Firm*—Stanley R. Moore; Thomas L. Crisman

[57] ABSTRACT

A fluid pulsed generator system including an elongated tubular member of uniform elastic parameters constructed for receiving fluid flow therein and abruptly terminating said flow to create an acoustic pulse containing most of its acoustic energy in the zero to 160 Hertz frequency spectrum. The system generates a directionally distinctive acoustic pulse. The system includes a fluid reservoir adapted for supplying a suitably high fluid pressure for driving a fluid through the elongated tubular member with sufficient velocity to generate an acoustic pulse basically of the classical water hammer variety. The device is provided in a marine configuration comprising an elongated acoustic radiating conduit containing the water hammer generated pressure pulse adapted for trailing from a vessel beneath the surface of a body of water. In a land based environment, the acoustic radiating conduit is encompassed within an elongated bladder having an enlarged base section and filled with the fluid to be circulated through the acoustic radiating conduit, providing a means for return utilization of the fluid and providing a desirable transfer medium between the acoustic pulse generated within the conduit and the earth's surface therebeneath. In the present invention, the entire length of the elongated tubular member itself manifests the use of the water hammer energy to generate an acoustic pulse whose frequency content lies almost entirely in the zero to 160 Hertz band. The distribution of the acoustic pulse generating water hammer wave along the elongated conduit provides a means for controlling the directionality of the radiated acoustic wave.

24 Claims, 7 Drawing Figures

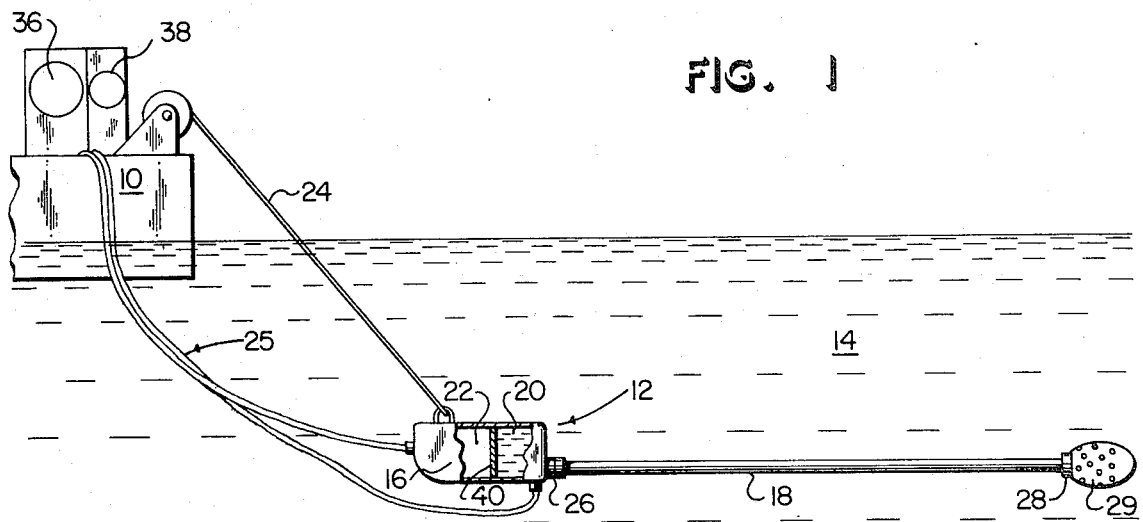
FIG. 1
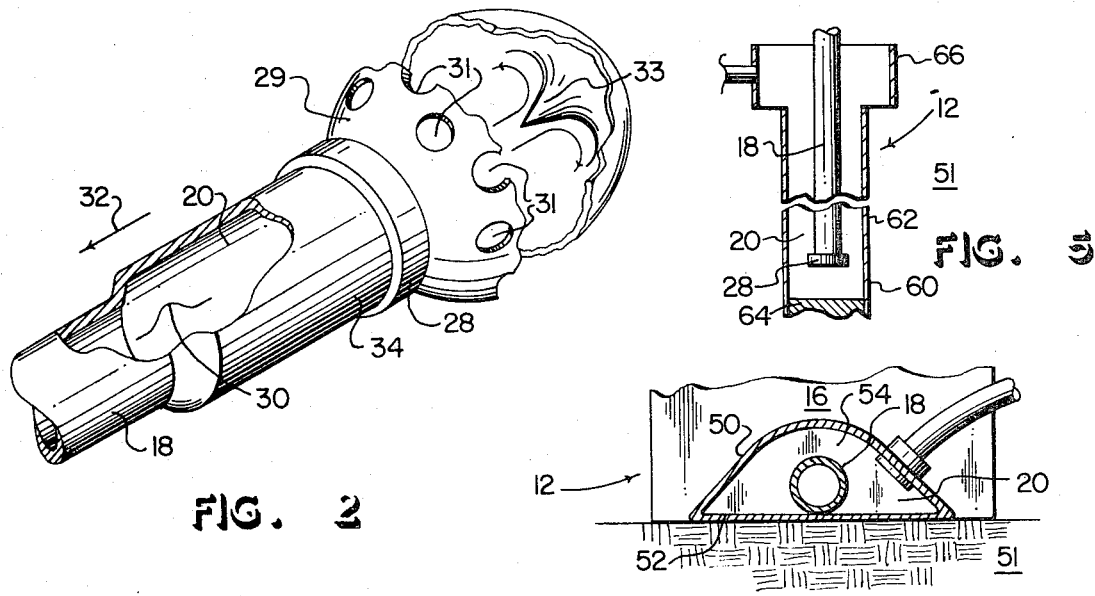
FIG. 2
FIG. 5
FIG. 4
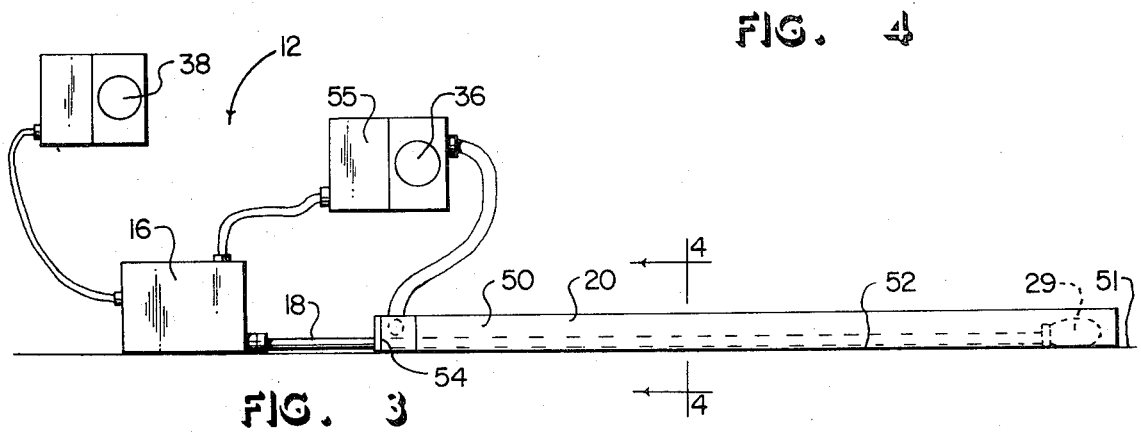
FIG. 3

FLUID ACTUATED ACOUSTIC PULSE GENERATOR

BACKGROUND OF THE INVENTION

The invention relates to the generation of acoustic energy in a fluid environment, and, more particularly, to the use of the water hammer principle to generate the acoustic energy where most of the frequency content lies in the zero to 160 Hertz band. A characteristic of the acoustic radiator is the ability to generate a direction distinctive acoustic wave adaptable for use in both marine and land environment.

In conducting seismic exploration in both marine and land areas it has been the practice to generate seismic waves by the detonation of explosive charges or by the utilization of mechanical or electrical or thermodynamic devices to generate an impact or a vibration. Each of the various types of acoustic sources has undesirable characteristics such as the tendency to generate non-signal types of acoustic wave trains generally identified as "noise" in contrast to the desired "signal". Each of the various types of acoustic sources has its own pulse generating characteristic, generally providing frequencies of little value in seismic exploration or of a frequency rich in "noise" spectrum.

All marine acoustic pulse generators have an undesirable characteristic known as the hydraulic afterflow, which generally introduces a seismic "noise" that severly distorts the desired seismic "signal". The problem of the "afterflow" is well stated in the Seismic Energy Sources 1968 Handbook prepared by Staff Members of United Geophysical Corporation, Pasadena, Calif. on Page 9.

"All types of underwater seismic energy sources inevitably give rise to hydraulic afterflow. The phenomenon is inherent in the "point" (or linear) nature of the source, and in the associated spherical (or cylindrical) divergence. Afterflow represents temporary storage of kinetic energy not immediately radiated. This energy must ultimately be dissipated or taken care of in some fashion, and all seismic energy sources must contend with this situation."

Much effort has been expended to develop or to instigate various techniques designed to remove afterflow by a cancellation process making use of a number of individual sources in various combinations. All efforts to develop an acoustic source free of these afterflow effects have been to no avail, just as predicted in the 1968 statement in the Handbook. Some success has been achieved by using more than thirty individual sources each of a different characteristic, time wise and pulse wise, such as an array of air guns, in a semirandom configuration in an expensive and complicated array.

The Energy Handbook (1968) analyzes in detail more than fifteen types of marine acoustic sources and applies the following basic acoustic approximation equations to each of these source types in the analysis:

$$v = \frac{p}{\rho c} + \frac{1}{\rho r} \int_0^t p\, dt$$

v is instantaneous particle velocity
p is instantaneous (excess) pressure (P-Po)
$\rho$ is density of water
c is velocity of sound propagation in water
$\rho c$ is acoustic impedance of water
r is radial distance to measurement point
t is time The first term is the acoustic or radiation term showing particle velocity in the acoustic pressure wave is proportional to the excess pressure generated by the source. The second term, proportional to the time integral of pressure $$\int_0^t p\, dt$$

is the afterflow.

The optimum seismic acoustic source would generate a high instantaneous pressure with no outward or tangential expansion.

A purpose of the invention is to provide a means for generating an acoustic pulse to be transmitted into the surrounding fluid medium, in a marine environment, in such a manner that the hydraulic afterflow has been reduced to the vanishing point. This is achieved by containing the pressure pulse in a highly rigid but acoustically transparent conduit so that there is essentially no tangential expansion or spherical divergance.

It is well known that when a rapidly flowing stream of water in a rigid conduit is suddenly arrested by closing a valve in the conduit, the kinetic energy therein is converted to pressure energy. The pressure pulse generated by this energy conversion travels upstream away from the valve in the rigid conduit until it is reflected in total or in part by a discontinuity in the conduit, to be reflected again at the closed valve. It is the above described phenomena which is known as "water hammer".

The water hammer phenomena is discussed in great detail in many books, papers and reports. In Hydraulic Transients, McGraw Hill 1951, the author George R. Rich, explains the phenomena, develops the equations, depicts typical water hammer transients and applies the principles to various problems related to water power plant conduits. A similar analysis is presented in Fluid Mechanics, McGraw Hill 1958, by Victor L. Streeter. In these source medias the water hammer wave is shown to be a succession of square waves of pressure with each pressure pulse having a time span equal to 2 L/a, where "L" is the conduit length and "a" is the speed of the water hammer wave, each followed by a rarefaction pulse covering a similar time span. The agreement between calculated and measured pressure pulses is excellent, confirming the theoretical soundness of the water hammer theory.

The zone or local of the conversion of kinetic energy into elastic strain or pressure energy travels upstream with an acoustic wave velocity "a" leaving the water downstream behind the advancing wave front at zero velocity, but at a high pressure in a slightly expanded conduit. The pressure developed by the water hammer is $$p = M \frac{dv}{dt}$$

where "M" is the mass of water whose velocity is reduced the amount "dv" in time interval "dt".

Analysis of the water hammer phenomena in a physically realizable system, such as in this invention, shows that the pressure developed by arresting the fluid flow is $$p = 0.4335 \frac{V}{g} \sqrt{\frac{1}{Qw/g}}$$

where
V is the velocity of water flow in the rigid conduit before valve closure in feet per second;
g is acceleration of gravity in feet per second squared;
w is weight of water in pounds per cubic foot;
Q is $$\frac{1}{K} + \frac{D}{bE} = 0.0772 \times 10^{-6};$$

K is bulk modulus of water under compression=46,080,000 pounds per square foot;
E is modulus of elasticity of conduit, glass reinforced nylon=144,000,000 pounds per square foot;
D=diameter of conduit in feet; and
b=thickness of conduit wall in feet.

The velocity of travel in feet per second of the water hammer wave within the conduit "a" is given by the following equation:

$$a = \frac{1}{\sqrt{Qw/g}}$$

The water hammer pressure can be expressed by the following equation, which is a combination of the two preceeding equations:

$$p = 0.4335 \frac{Va}{g}$$

The above equation shows that the pressure in the water hammer wave is proportional to fluid flow velocity, which is readily controllable by varying the magnitude of the pressure forcing the fluid to flow through the conduit. The velocity of travel of the water hammer wave "a" is dependent upon the bulk modulus of water, which is invariable, and the modulus of elasticity of the conduit material and the ratio of conduit diameter to conduit wall thickness. Thus, in a particular system, the only variable affecting the pressure developed in the water hammer wave is the velocity of flow. To develop high water hammer pressures it is necessary to have a means for supplying a high pressure to force the fluid to flow.

The equation showing the expansion of the conduit caused by the fluid under high pressure in the section behind the water hammer wave is:

$$\frac{\Delta D}{D} = \frac{Dp}{2bE}$$

The above equation shows that the pressure developed by the water hammer is directly proportional to the velocity of water flow. The present invention includes provision for the use of glass fiber reinforced nylon resulting in Q of $0.0772 \times 10^{-6}$. The water flow velocity is 500 feet per second, resulting in a water hammer wave travelling in the conduit at a wave speed of 2545 feet per second and a pressure of 17,240 pounds per square inch. The conduit expansion caused by this increase in pressure is approximately seven percent, or a conduit eight inches in diameter would expand approximately one half of an inch in diameter.

It is apparent that the present invention would provide a means for generating very high pressures by the water hammer phenomena with very small mass flow associated with the seven percent increase in diameter of the conduit. It is noted that the mass flow is distributed over the time of travel of the wave front from the valve to the open end of the conduit. The present invention also teaches the use of a radiating conduit which may be on the order of forty feet in length. The water hammer wave travels at a velocity of 2545 feet per second in a glass fibre reinforced nylon conduit. The acoustic pulse radiated from the water hammer wave of compression in travelling from the valve to the open end and back to the valve, a distance of 80 feet consumes thirty one milliseconds. The wave then is reflected at the valve and travels to the inlet end of the conduit and returns in the form of a rarefaction with reduced pressure approaching the vapor pressure of water, in thirty-one milliseconds. Thus, a semi-square wave results with a period of 0.62 milliseconds equivalent to sixteen Hertz. A spectral analysis of this semi-square wave shows a primary concentration of acoustic energy in the zero to 32 Hertz band up to 80 Hertz band, with essentially all the energy within the 0-160 Hertz band. One feature of the invention is the ability to control the frequency of the acoustical pulse by selection of length of conduit. The time span of the compression and rarefaction phases of one cycle of a semi-square wave is inversely proportional to the length of the conduit. The pulse generated within a radiating conduit 40 feet long has a concentration of its energy within the zero to thirty-two Hertz frequency band, if the conduit is 20 feet long the energy is concentrated in the zero to sixty-four Hertz band.

Another feature of the present invention is thus the use of conduit material that is acoustically transparent such as glass fibre reinforced nylon or Dupont Kevlar Aramid reinforced material which have very high modulus of elasticity and acoustic impedance essentially the same as water. Thus, the acoustic pulse simply passes through the walls of the acoustically transparent material of the conduit. Since the conduit does not act as a diaphragm, which is the case when a highly compliant material such as polyurethane elastomer or similar plastics material or rubber is used, there is no mass flow. The mass flow or afterflow is a function of the degree of compliance of the conduit material. Also, the magnitude of the acoustic pulse is affected by the compliance of the material, and in some cases the compliant diaphragm acts as a terminator of the water hammer wave due to the elastic discontinuity introduced by the diaphragm. In this case only the area of the opening into the diaphragm radiates acoustic energy.

The generation of water hammer waves in a unique arrangement of rigid metal conduit and various flexible diaphragms was examined in great detail by Billy Wayne Davis and the results were published in a Dissertation from Southern Methodist University, Apr. 9, 1969, entitled "A Study of the Spectral Character of Acoustic Waves Radiated by a Waterhammer Excited Cylindrical Diaphragm". The results of this study were summarized and reported in part in a paper presented by Davis at the Offshore Technology Conference, April, 1970, entitled "The Transient Character of the Near-Field Acoustic Radiation from a Cylindrical Diaphragm Excited by Waterhammer Transients".

The device disclosed by Davis to generate the water hammer waves consisted of a section of aluminum pipe whose length is denoted by Ly, then a flexible polyurethane elastomer diaphragm length L, and then another section of aluminum pipe length Lx terminated in a valve mechanism. A portion of the upstream or uppermost aluminum pipe is immersed in a water test tank, the entire diaphragm is submerged as is the lower section of aluminum pipe. Water in a pressure tank is forced through the system and a means is provided for suddenly arresting the water flow at the end of the lower section of aluminum pipe. Means are provided for measuring and recording photographically the velocity of water flow at the instant of closure of the arresting valve. Calibrated blast transducers were inserted into the wall of the aluminum pipe. One was located near the arresting valve, one was located near the lower end of the diaphragm, one near the upper end of the diaphragm and another some distance upstream from the diaphragm. The outputs of these blast transducers were displayed on an oscilloscope and recorded photographically on Polaroid Film. The acoustic pulse radiated into the water was recorded in a similar manner using a calibrated hydrophone located three feet to one side of the midpoint of the flexible diaphragm.

Davis made amplitude frequency spectrum analysis of a large number of pulse recordings. He reported, for a flow velocity of 34.6 feet per second that 67% of the total acoustic energy was in the 0–3000 Hz and less than 3% to be in the 0–100 Hz band, as shown in FIG. 25. The conclusions then set forth in this disclosure on Pages 75 and 76 include:

That acoustic energy radiated by a water hammer excited cylindrical diaphragm is distributed rather evenly over a broad frequency band 0–4000 Hz;

That peak acoustic pressure of 88 psi at 3 feet could be achieved by a flow velocity of 170 feet per second and pipe diameter of 9.00 inches; and That the length of diaphragm, above 9.5 inches, has no appreciable effect upon energy concentration within the spectrum.

The present invention provides for generation of acoustic pulses by a water hammer pressure wave of 17,240 pounds per square inch, which is some 10 times greater than that disclosed in the aforesaid prior art reference. The pulse width is 31 milliseconds which is some 200 times broader than that of the Davis disclosure and essentially all the available energy will be in the 0–80 Hz band up to the 0–160 Hz band, whereas less than 3% of the energy in the pulse developed in the Davis system is in the 0–100 Hz band. The radiating surface in the invention is the entire circumferential surface of a conduit some 40 feet in length whereas the radiating surface in the case of Davis is only the area of the end of a metal pipe. In the case of an 8 inch conduit 40 feet long the radiating surface is 240 times greater.

Other prior art contructions have heretofore proposed utilizing the water hammer concept by providing aquatic means for generating pulses by the water hammer phenomena and detecting same in a seismic detection system. One such prior art apparatus is set forth and disclosed in U.S. Pat. No. 3,376,949 issued to Buford M. Baker and James H. Waugh, Jr. on Apr. 9, 1968 and entitled "Water Hammer Marine Seismic Source". In the embodiment of the water hammer set forth therein, the apparatus effecting the water hammer includes a tubular member having a perforated zone formed upon one end thereof for permitting escape of fluid flow energy to produce the seismic wave in the particular marine environment for which the apparatus is constructed. The tubular member itself is not constructed for pressure wave propagation. As described therein a heavy rubber tube, or the like, is clamped around the perforated region of the tubular member to encompass the perforated zone. The pressure wave energy of the flowing stream is then vented by being transmitted through the perforations in the zone. Means are therein provided for abruptly terminating the flow to permit the select pressure fluid flow through the aforesaid perforations. Baker proposes the use of a rubber tube surrounding a perforated zone in the pipe containing the fluid flow. There is no essential difference between the device disclosed by Baker and the device investigated by Davis. Both provide for a highly compliant diaphragm through which the pressure in the water hammer wave appearing at the end of the solid pipe is radiated into the surrounding fluid.

Acoustic sources used on land utilize dynamite, either placed on the surface, or to various depths below the surface. Other land acoustic sources consist of impulse generating mechanical or thermo-mechanical devices such as a dropping weight, an impact generated by air gun driven impactor, a vibrator, or by burning of combustible gases in an impactor chamber. Everyone of these various sources generates an acoustic pulse, in the case of the vibrator time varying, that is designated as the signal or desired pulse, plus a rather complete spectrum of "noise" waves such as Raleigh waves, commonly called "ground roll", and shear waves all of which are multiply reflected and scattered from the physical discontinuities in the earth's surface. These noise waves are generated primarily as a result of surface or near surface deformation of a "mass flow" or transient or permanent type.

Other references which may relate generally to this subject matter include:

| U.S. Patent No. | Date     | Name         |
|-----------------|----------|--------------|
| 3,536,157       | 10/27/70 | Anstry       |
| 2,281,751       | 5/05/42  | Cloud        |
| 3,690,403       | 9/12/72  | Davis        |
| 3,721,311       | 3/20/73  | Mott-Smith   |
| 2,424,108       | 7/15/47  | Merten       |
| 3,863,203       | 1/28/75  | Patton et al |
| 2,759,143       | 8/14/56  | Arps         |
| 3,376,949       | 4/09/68  | Baker et al  |

A purpose of this invention is to generate an acoustic impulse that is coupled to and transmitted into the earth's surface with a minimum of "mass flow" or surface deformation of a transient or permanent type and yet within a predefined frequency band. A high pressure acoustic pulse is generated in a rigid, acoustically transparent conduit which pulse of predetermined frequency is coupled to the earth's surface through a surrounding water medium in close contact with the earth's surface.

There is an almost complete absence of any "mass flow" associated with the water hammer generated acoustic pulse, thus there is essentially no "mass flow" or deformation of the earth's surface, either transient or permanent resulting from the coupling of the pulse from the generator by fluid means contained within the flexible chamber surrounding the acoustic radiator. The acoustic pulse is distributed over a considerable lateral extent due to the elongate acoustical transparent tube within which the pulse is generated. The pressure pulse in the water hammer travels horizontally in the elongate tube, thus by choice of orientation of the tube, the direction and the effective shape of the pulse can be controlled.

SUMMARY OF THE INVENTION

The invention relates to a fluid actuated acoustic pulse generator, which generator includes a rigid noncompliant acoustically transparent elongated tubular member specifically adapted for receiving and abruptly terminating fluid flow therein. In particular, the apparatus includes a high pressure fluid vessel for containing the fluid necessary for generating a high amplitude acoustic pulse substantially within a predefined frequency band of 0–160 Hz. An elongated conduit having known uniform, physical properties is secured to the fluid vessel and in valved relationship therewith for controlling fluid flow therethrough. A second valve member is secured about the outward end of said tubular member which valve element is particularly constructed for abrupt termination of fluid flow in response to remote actuation thereof. The apparatus is provided in one embodiment for marine application and the submerged towing behind a marine vessel during seismic exploration.

In another aspect, the invention includes a high pressure fluid vessel in valved communication with a rigid non-compliant acoustically transparent elongated tubular member being circumferentially contained within an elongated bladder having an enlarged base portion for physically contacting the surface of the ground in acoustic communication therewith for transmitting acoustic pulses therethrough. The particular embodiment constructed for applications upon land facilitates the utilization of the acoustic fluid in a recycling system whereby a plurality of acoustic shock waves may be generated within a closed system configuration. In like manner, the apparatus is provided in such structural embodiments that a plurality of elongated tubular members may be disposed side-by-side to comprise a seismic array upon a subject land surface.

BRIEF DESCRIPTION OF THE DRAWINGS

For a more complete understanding of the present invention and for further objects and advantages thereof, reference may now be had to the following description taken in conjunction with the accompanying drawings, in which:

FIG. 1 is a perspective view of one embodiment of an acoustic pulse generator constructed in accordance with the principles of the present invention;

FIG. 2 is an enlarged diagrammatical perspective representation of a section of the elongated tubular pulse propagation, member of FIG. 1 illustrating the effects of the water hammer therein;

FIG. 3 is a side elevational view of an alternative embodiment of the present invention illustrating one construction of the acoustic pulse generator adapted for land operation;

FIG. 4 is an enlarged front elevational cross-sectional view of the pulse generator of FIG. 3, taken along lines 4—4;

FIG. 5 is a side elevational fragmentary view of an alternative embodiment of the present invention illustrating another construction of the acoustic pulse generator.

DETAILED DESCRIPTION

Figure 6A:
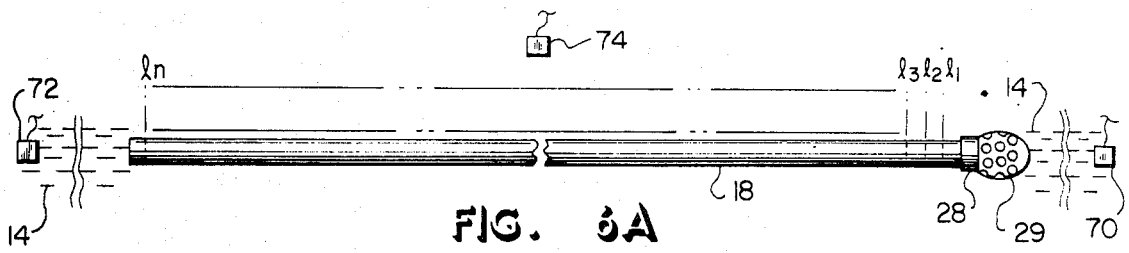
FIGS. 6A and 6B are graphical representations of the pulse generator of the present invention and the directionally distinctive pulse configuration thereof.

Referring first to FIG. 1, there is shown one embodiment of a fluid actuated acoustic pulse generator constructed in accordance with the principles of the present invention and particularly adapted for marine applications and the generation of a directionally distinctive acoustic pulse of a predefined frequency band. As shown in FIG. 1, a surface vessel 10 provides means for moving the acoustic pulse generator system 12 through a body of water 14 disposed therearound. The system 12 is comprised of a pressure vessel 16 sealably secured to an elongated tubular member or conduit 18, trailing therefrom. The conduit 18 is a tube having uniform elastic and dimensional parameters over the length thereof. The fluid reservoir 16 is constructed for containing a fluid such as water 20 therein, preferably in conjunction with a volume of air 22 for providing the generation of rapid fluid flow velocities within said tubular element thereof.

Still referring to FIG. 1, the vessel 10 is adapted for towing the system 12 through the water 14 by conventional submersible tow means, such as cable 24. A secondary cable 25 is preferably constructed therewith or provided therealongside for facilitating vessel to generator communication. Signals from the vessel 10 transmitted along the cable 25 induce actuation of control means in the system 12. The control means preferably include an upstream valve 26 at the fore end of the water hammer conduit 18 for initiating fluid flow therein. A second, downstream valve 28 is disposed in the vicinity of the lower end of the conduit 18 for abruptly terminating fluid flow therein. The valves 26 and 28 may be operated by hydraulic, air pressure, or electrical means communicated thereto from the vessel 10 via cable 25. It is preferable for maximum efficiency that the operation of the system 12 be effected from the vessel 10 in a manner that the valves 26 and 28 are actuated with a response time in the range of a few milliseconds. As shown in this embodiment, the valve 28 may be constructed to port into baffle structure 29 for diffusing and spherically dissipating fluid flow therefrom and preventing collateral mass flow pulsation of appreciable magnitude as discussed in more detail below.

In the operation of the system 12, upstream valve 26 is first opened to permit the high pressure water 20 within the pressure vessel 16 to initiate its high velocity flow through the conduit 18. The velocity of the water is permitted to accelerate from zero to a maximum velocity before the abrupt closure of downstream valve 28, therein inducing a high amplitude pressure pulse within the elongated preferably rigid, solid wall pulse propagation element in the form of the conduit 18. The term "solid wall" is utilized to define a nonporous wall construction as compared to a perforated wall or the like which would permit radial fluid passage therethrough. The pressure pulse may be a magnitude ranging from 10,000 to 17,000 psi depending on the flow velocity of the water stream and associated physical characteristics of the conduit 18. The physical characteristics of the conduit 18 proscribe a rigid, noncompliant, acoustically transparent material whose acoustic impedance closely approximates that of the surrounding water 14. A material such as glass fibre or DuPont Kevlar Aramid, fiber reinforced material has been shown to have the desired characteristics.

Referring now to FIG. 2, it may be seen that upon closure of the downstream valve 28, the kinetic energy of the water 20 flowing through the relatively rigid conduit 18 is suddenly converted into a pressure wave that radiates acoustic energy through the walls of the conduit into the surrounding medium. The pressure wave is also manifested in the radial expansion of the relatively rigid conduit 18, within its elastic limits as shown diagrammatically herein. The pressure pulse in such an embodiment will travel at a velocity of 1,700 to 3,000 feet per second along the length of the conduit 18, acting as a moving acoustic radiator therealong. The conversion efficiency of the acoustic generator may be seen to be very high in that essentially all of the kinetic energy is converted into acoustic energy along the length of the conduit 18 and within a readily calculable, relatively narrow frequency range. It may further be seen that the velocity of travel of the pulse is a function of the material of the conduit 18 and the diameter to wall thickness ration thereof. The length of time during which the acoustic pulse is radiated and the lateral distance over which the pulse is generated as well as its amplitude as a function of time is controlled by the material of the conduit 18, the diameter to thickness ratio thereof, the length and diameter, the velocity of the water flow in the conduit and the depth of the conduit below the surface of the water 20.

The phenomena of water flow in pipes and that of pressure pulse generation when the water flow is disrupted is well understood and has been treated by many authors during the last century. For example, the velocity of travel of the pressure pulse (a) may be given by the following equation:

$$a = \frac{1}{\sqrt{Qw/g}} \quad Q = \frac{1}{K} + \frac{D}{bE}$$

In the above equation, K equals the bulk modulus of compression of water, approximately 46,080,000 pounds per square feet. E equals the modulus of elasticity of the conduit material, such as glass fiber reinforced nylon, approximately 144,000,000 pounds per square feet. D represents the diameter of the pipe in feet and be the wall thickness of said pipe in feet. W is the weight of water in pounds per cubic feet and g is the acceleration of gravity, approximately 32 feet per second per second or per second squared.

For purposes of example only, an illustration will be given for a pipe diameter to pipe wall thickness ratio ($D/b$) of 8 producing a pulse velocity of 2,545 feet per second.

Still referring to FIG. 2, it may be seen diagrammatically that upon closure of the downstream valve 29, the adjacent water is brought to rest and a wave 30 of positive pressure travels upstream, in the direction of arrow 32, therein compressing the water 20 and radially stretching the conduit 18 as shown in the section 34 thereof. Upon reaching the storage vessel 16 the pressure wave 30 obtains relief and drops down in intensity to the reservoir pressure. This in turn allows the compressed water 20 stored in the stretched section 34 of conduit 18 to drop down to reservoir pressure again by means of the passage of negative pressure wave travelling downstream (not shown). Because of the inertia of the water, when the negative wave (not shown) reaches the closed valve 28 it will be travelling downstream and will be reflected at the valve 28 so as to travel upstream. Behind the downstream of the negative wave being reflected the conduit will shrink a proportionate amount below the original size so as to furnish the volume of water necessary to maintain the velocity of the negative wave. When the reflected negative wave reaches the reservoir again the pressure will rise to reservoir level and a positive pressure wave elevating the conduit pressure to reservoir pressure will be propagated downstream in the manner described above. Theoretically, in the absence of friction this cycle will be repeated indefinitely but due to the frictional considerations the subsequent wave forms are dampened substantially.

It may be seen from the above-described mathematical description of the system 12 that a further unique pulse generation characteristic results from the fact that the acoustic pulse travels laterally along the conduit with a time varied amplitude at a velocity different from that of sound in water. The time-amplitude shape of the acoustic pulse is thus different with different radiation angles. For example, the pulse has a different shape when viewed from the downstream end of the conduit as compared to the upstream end at the reservoir. By predefining the orientation of the conduit and its length a precise direction and shape of generator pulse can be selected to achieve the desired response characteristics. One such desirable characteristic is the orientation of the conduit 18 to eliminate reflection pulses from the water air interface at the water surface and/or collateral noise.

Referring again to FIG. 1, it may be seen that water egressing through the conduit 18 is supplied from the storage vessel 16 which may be replenished while in a submerged configuration with the utilization of a water pump 36 or the like either housed therein or on the vessel 10 as shown. Such a fluid pump preferably would operate continuously, while the duty cycle of the acoustic generator itself, including the conduit 18 and valve structure, would be intermittent to maximize the effectiveness thereof. The continuous duty cycle of the pump would permit a smaller pump size and diminished power requirement to maintain the necessary storage level in the reservoir 16. With the aforesaid water pump system located on the vessel 10 cable 25 would preferably include a high pressure fluid supply line. In this manner, air and/or water can be supplied thereto, depending on the internal mechanical configuration of the reservoir 16.

Still referring to FIG. 1, it may be seen that the air 22 is supplied to the reservoir 16 in the same manner as the water 20 is supplied thereto in that a pump 38 disposed atop vessel 10 is provided therefor. For this reason, the internal mechanical configuration of the reservoir 16 of this particular embodiment includes a reciprocating freely moving diaphragm or piston 40. Air 22 is provided to one side of the piston 40 to drive it against the water 20 stored on the other side. This particular structure prevents the water from absorbing the high pressure air which would cause outgassing problems in the conduit 18 during the flow therethrough. It is important to note that in the present invention flow uniformity is a design criteria for eliminating collateral pulse noise while achieving peak pulse amplitude. The elimination of gas bubbles in the conduit 18 whether implanted from outgassing or cavitation, is therefor desirable.

The construction of the conduit 18 with a smoothly finished interior will also facilitate the above optimal performance characteristics. It is particularly noteworthy that the conduit 18 of the present invention is constructed with a uniform section and material therealong for eliminating extraneous reflection pressure pulses. As the pressure wave propagates within the conduit 18, any surface discontinuity or restriction will interfere with the travel of the water hammer wave front, therein setting up a pressure wave in the opposite direction. For this reason the diameter, construction, and material of the conduit 18 is a constant therealong between upper and lower valves 26 and 28, respectively.

Referring now to FIGS. 3 and 4, there is shown an alternative embodiment of the present invention wherein the acoustic generator system 12 is provided in a land based, or mounted, configuration. The system 12 is comprised of the pressure vessel 16 secured adjacent the elongated conduit 18 which is housed within an elongated bladder 50. The bladder 50 rests against the land 51 and has an enlarged base section 52 for the system to land interface whereby maximum acoustic transfer may be effected. The cross-sectional configuration of the system 12 for acoustic generation upon land in this particular embodiment is that of a "bell" curve, wherein the conduit 18 is disposed generally centrally therethrough for transmitting the water hammer pulse radially therefrom. In this configuration, the water 20 provided therein fills the intersitial region between the bladder 50 and the conduit 18 therein providing a return path for the water 20 back to the storage reservoir 16. Therefore, with the bell-shaped configuration of the bladder 50, a maximum degree of downwardly propagating acoustic energy is transmitted to the ground from the conduit 18 through the water therearound.

Still referring to FIGS. 3 and 4, a valved bulkhead 54 is provided for matingly engaging the bladder 50 for receiving the return flow of water 20 therein and supplying same to the vessel 16 through a retrieval tank 55 adjacent the fluid pump 36. In this manner, the flow of the water is confined to the system 12 which is totally self contained. In operation, the bladder 50 is preferably held in a low pressure condition, whereby egressing water from the conduit 18 will not meet a high pack pressure. To maintain the low back pressure the pump 36 preferably evacuates the bladder 50 into tank 55, which is shut off from the reservoir 16 to permit the filling thereof. Conventional valving is available for facilitating this interaction. Reservoir 16 preferably includes a piston 40 (not shown) actuated by air from a pump 38 as discussed above for the apparatus of FIG. 1.

In other alternative embodiments, the system 12 can be incorporated with a plurality of parallel and/or perpendicular systems 12 to comprise an array thereof and further enhance the responsive pulse shape and amplitude definition. The various arrays (not shown) could be provided in select grid patterns specifically desirable for certain types of seismic exploration. For example, the acoustic pulses of the present invention are of a character compatible with oceonographic mapping. A system 12 may easily be incorporated into existing sea-going vessels as "trailing antennas" for both naval and merchant utilization. Unlike most prior art constructions, the present invention utilizes a high amplitude pulse with little collateral noise. Since the "antenna" is basically comprised of the elongated conduit 18, the effects of drag are reduced compared to devices incorporating external support struts, or the like.

In applications such as that depicted in FIGS. 1 and 3, it may be noted that the jet of water 20 egressing from the conduit 18 will produce a propulsive force. For this reason the reservoir 16 is preferably constructed of a size to house a substantial mass of water 20 for resisting said propulsion. It may thus be seen that although the marine configuration of reservoir 16 is streamlined the mass thereof may be provided in sufficient quantity whereby the inertia thereof substantially offsets said propulsion.

In land based configurations, such as that shown in FIG. 2, the system 12 can be anchored to the ground 51.

Referring now to FIG. 5, there is shown a fragmentary view of an alternative embodiment of the system 12 in a downhole configuration. A borehole 60, having a liner 62 is preferably capped at the select depth with a plug 64 and filled with water 20. Topside, the borehole 60 is preferably provided with a circular bulkhead, or retaining wall 66 therearound for recapturing the water 20 egressing from said borehole. The pressure and recirculation systems above described are not shown in this view since the basic configuration variation centers around the pulse conduit 18. The conduit 18 is positioned in a generally vertical orientation while depending from suitable support structure (not shown). The acoustic pulse generated by closure of the valve 28 is radiated outwardly through the water medium therearound which facilitates transfer into the land 51. It may thus be seen that the system 12 is adaptable to any angle of inclination and the effectiveness thereof accentuated by the return water medium therein.

The effectiveness of the system 12, as herein described may be further illustrated by addressing certain aspects of the fluid flow in the conduit 18. As described above, the pressure wave 30 illustrated in FIG. 2 is propagated along the full length of the conduit 18 at a rate different from that of the surrounding water 14. Each incremental movement of the wave 30 in the conduit 18 is, in effect, a separate pulse in relation to the water 14. The elongated propagation of the wave 30 thus generates an effective "simple" high amplitude pulse of a time duration comprising the sums of "incremental" pulses. In this manner, the length of the conduit 18 can be varied to "tune" the desired pulse definition for the particular medium and materials involved. For example, conduit lengths of 18 to 22 feet and 38 to 42 feet have been found desirable for the application defined herein. At such lengths the "phase" relationships of wave propagations between the water 14 and conduit 18 are readily ascertainable and definable as discussed above. In particular, such embodiments produce pressure pulses wherein essentially all the available energy will be in the 0-160 Hz band unlike the previously discussed prior art configurations. Such control and effectiveness is totally contrary to the short, high amplitude pulse produced from explosive charges and related "mass flow" pulse generators. In addition, the absence of collateral mass flow about the conduit 18 eliminates the "noise" generally associated with such apparatus, which further facilitates the definition of the directionally distinctive pulse.

To further explain the directionally, distinctive acoustic pulse configuration of the present invention, it may be shown that the generation of an acoustic pulse by the water hammer phenomena can be better understood if $l_1, l_2, l_3-l_n$ represent successive, infinitesimally short sections of the conduit 18 beginning at the downstream valve 28. Referring now to FIG. 6A the instant the valve 28 is closed, the water in section $l_1$ is brought to rest and its kinetic energy is transformed into pressure energy; the water in section $l_1$ is somewhat compressed, and the conduit wall of section $l_1$ expands slightly as illustrated in FIG. 2. The pressure energy in small section $l_1$ thus creates an acoustic pulse that is transmitted into the water 14 surrounding that portion of the conduit 18. As the pressure wave travels upstream each infinitesimal section of the conduit generates an acoustic pulse that is transmitted into the water 14 surrounding that portion of the conduit 18. As the pressure wave travels upstream each infinitesimal section of the conduit generates an acoustic pulse until the wave reaches upstream end. By the principle of superposition the total effect of this travelling pressure wave can be viewed as the summation of all the strond, but infinitely short duration pulses generated by said short sections. For example, if the conduit is 40 feet long and the velocity of the water hammer wave therein is 2000 feet per second, the water hammer pulse travels the length of the conduit in twenty milliseconds. A five millisecond pulse minimum has been found to be preferable in conduit design.

In operation the conduit 18 is immersed in the water 14 whose sound velocity approximates 5000 per second. Thus, each small energy segment travels to remote seismic, acoustic detectors, or hydrophones at a velocity of 5000 per second. If a hydrophone 70 is in-line with the conduit 18 and beyond the downstream valve 28, the water hammer wave travels away from the hydrophone at 2000 feet per second and each infinitesimal acoustic pulse must travel back through the surrounding water at a velocity of 5000 feet per second. The effect thereof is to reduce the overall average pulse amplitude due to the increase in distance travelled and to increase the pulse duration from twenty to twenty-eight milliseconds. From the opposite direction, if a hydrophone 72 is beyond the upstream end of the conduit 18 the water hammer wave, in travelling toward the hydrophone 72, shortens the distance, thus increasing the average amplitude and shortening the pulse duration from twenty milliseconds to twelve milliseconds. A hydrophone 74 placed contrally therebetween, at a right angle to the conduit 18, would see little amplitude variation due to its position or "direction".

Thus, it may be readily seen that the shape and duration of the pulse, through the use of the present invention, can be controlled by the directional orientation or directionality of the fluid filled conduit 18 relative to the preferred direction of wave travel. The term "directionally distinctive" as used herein refers to the aforesaid capability of controlling the pulse shape through selectively orienting the conduit 18 relative to the direction of desired acoustic wave travel. In seismic exploration, to improve the useful information content of the seismic signal and to improve the signal to noise ratio, it is highly desirable to control the pulse characteristics of the seismic source. This is achieved in this invention by selecting the length of the conduit 18, its material, as well as controlling its orientation.

A further advantage of the present invention is the control of the frequency content of the acoustic pulse travelling upward to the water surface, there to be reflected back into the sub-surface, producing a "ghost" effect. The ghost is highly undesirable in data analysis of offshore exploration. With the present invention, the frequency content of the ghost is different than that of the downward pulse, therein being controlled by the degree of verticality of the conduit 18.

Figure 6B:
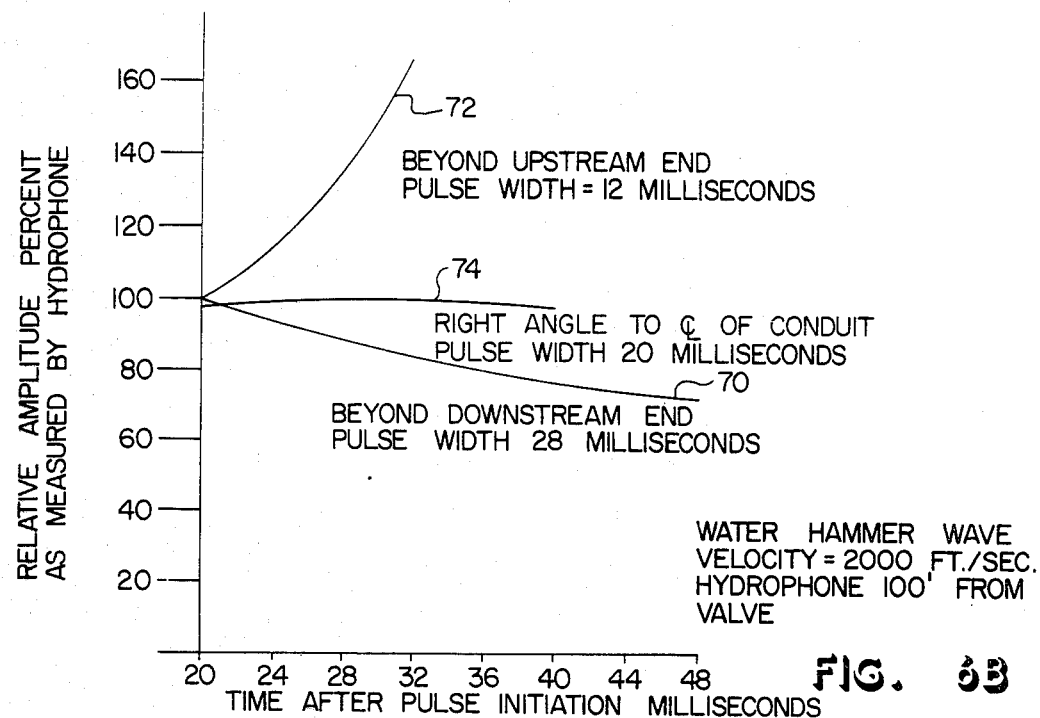

Referring now to FIG. 6B there is shown graphically the "directionally distinctive" aspect of the present invention discussed above. In FIG. 6B, the pulse configurations received by hydrophones 70, 72 and 74 are charted together for a conduit 18. In said figure the results are mathematically derived from a set hydrophone position of 100 feet from the conduit in the directions illustrated in FIG. 6A.

It may finally be seen that the improved amplitude, duration and direction definition of the pulse produced by the elongated, uniform conduit 18 of the present invention is of such quality that utilization of the baffle 29 discussed above may not be necessary. However, such a deflector chamber is described to illustrate one manner of reducing collateral mass flow noise usually associated with underwater pulse generators. The baffle 29 is preferably constructed to "contain" the directionalized, high velocity water emission from the valve 28 and reverse it with thrust reversing vanes 33 to counteract the jet force of the fluid egressing therefrom. The baffle 29 is thus constructed with a plurality of apertures 31 therearound for venting the egressing water deflected by the vanes therein.

It is thus believed that the operation and construction of the above-described invention will be apparent from the foregoing description. While the fluid actuated acoustic pulse generator shown and described has been characterized as being preferred, it will be obvious that various changes and modifications thereto may be made without departing from the spirit and scope of the invention as defined in the following claims.

I claim:

1. A fluid actuated acoustic pulse generator for radiating acoustic energy into a surrounding body of water in response to the abrupt termination of fluid flow within said generator, said generator comprising:

a submersible elongated tubular pulse propogation member of uniform, solid wall construction having a generally uniform internal cross-sectional diameter and material construction therealong for receiving a high velocity, undisturbed fluid flow therethrough and being formed to contain a water hammer pressure pulse therein and permit the substantially unrestricted propagation thereof, longitudinally therealong, said tubular member being formed of a substantially non-compliant material having substantially the same acoustic impedance as water;

a high pressure fluid storage vessel containing fluid therein under pressure for subsequent flow through said tubular member;

means for sealably communicating said storage vessel with the fore end of said tubular member for flow transfer therebetween;

valve means secured within the aft end of said tubular member for abruptly terminating flow therein and generating a water hammer pressure pulse uniformly therealong and substantially within a predefined frequency band; and means for communicating with said valve for the remote actuation thereof to control fluid flow within said tubular member and to remotely close said valve to abruptly terminate said fluid flow and generate said pressure pulse.

2. The apparatus set forth in claim 1 wherein the tubular member includes a valve at the fore end thereof between said tubular member and said storage vessel.

3. The apparatus set forth in claim 1 wherein the tubular member is constructed for being towed behind a marine vessel in a submerged condition for generating acoustic energy therefrom.

4. The apparatus set forth in claim 1 wherein the tubular member is disposed within an elongated bladder having a fluid filled interstitial region therein and adapted for pulse generation upon land.

5. The apparatus set forth in claim 4 wherein the elongated bladder includes a fluid recyclng pump for recirculating the fluid flow egressing from said conduit and supplying said fluid to said fluid storage vessel.

6. The apparatus set forth in claim 1 wherein the aft end of the tubular member includes a baffle member for dissipating fluid flow therefrom and reversing it to counter any propulsion forces developed therefrom.

7. The apparatus set forth in claim 1 wherein the tubular member is adapted for generally vertical suspension within a fluid filled borehole for the generation of an acoustic pulse therein.

8. The apparatus as set forth in clain 1 wherein said water hammer pressure pulse is generated substantially in the 0–160 Hz frequency band.

9. The apparatus as set forth in claim 1 wherein said water hammer pressure pulse is generated substantially in the 0–80 Hz frequency band.

10. The apparatus set forth in claim 1 wherein said tubular member comprises a length between 18 and 22 feet.

11. The apparatus set forth in claim 1 wherein said tubular member comprises a length between 38 and 42 feet.

12. A method of generating a fluid actuated acoustic pulse in a surrounding fluid medium comprising the steps of:
    providing a submersible elongated tubular pulse propagation member of solid wall construction having a generally uniform internal cross-sectional diameter and formed of a substantially non-compliant material having substantially the same acoustic impedance as water;
    suspending the tubular member in a fluid medium for transferring an acoustic pulse therethrough;
    providing a high pressure fluid storage vessel in sealed communication with the fore end of the tubular member;
    imparting a high velocity fluid flow from the storage vessel through the tubular member;
    abruptly terminating the fluid flow at the aft end of the tubular member to create a pressure wave therein and an acoustic pulse of a frequency between 0 and 160 Hz in the fluid medium therearound; and
    permitting the pressure wave to propagate substantially uninterrupted along the entire length of the tubular member to generate said acoustic pulse in the fluid medium therearound.

13. The method set forth in claim 12 wherein the fluid medium is a body of water in which the acoustic pulse is to be generated.

14. The method set forth in claim 12 and including the step of providing a fluid filled bladder containing a portion of the tubular member therein for generating acoustic energy upon land.

15. The method set forth in claim 12 and including the step of diffusing the fluid flow egressing from the tubular member to reduce noise associated therewith.

16. A method of generating a directionally distinctive, fluid actuated acoustic pulse comprising the steps of:
    providing an elongated, tubular pulse propagation member having a generally uniform internal cross-sectional diameter and formed of a substantially non-compliant material having substantially the same acoustic impedance as water;
    suspending the tubular member in a fluid medium for transferring an acoustic pulse therethrough;
    providing a high pressure fluid storage vessel in sealed communication with the fore end of the tubular member;
    imparting a high velocity fluid flow from the storage vessel through the tubular member;
    abruptly terminating the fluid flow at the aft end of the tubular member to create a pressure wave therein;
    permitting the pressure wave to propagate substantially uninterrupted along the entire length of the tubular member to create an acoustic pulse in the fluid medium therearound of a substantially predetermined frequency range; and
    orienting the tubular member to utilize the propagation velocity of the acoustic pulse generated therein, relative to the acoustic velocity of the surrounding medium, to achieve a directionally distinctive acoustic pulse.

17. The method set forth in claim 16 wherein the fluid medium is a body of water in which the acoustic pulse is to be generated.

18. The method set forth in. claim 16 wherein the elongate member extends forward and backward from the pressure fluid storage vessel.

19. The method set forth in claim 16 wherein a plurality of acoustic pulse generators are suspended in the fluid medium at various angles relative to the surface.

20. The embodiment set forth in claim 16 wherein several elongate members are attached to a single reservoir.

21. The method set forth in claim 16 including the step of varying pulse characteristics by varying length of said elongate members.

22. The method set forth in claim 16 including using several elongate members of different length fired simultaneously or aternatively to control pulse characteristics.

23. The method set forth in claim 16 wherein said acoustic pulse is generated substantially in the 0–160 Hz frequency band.

24. The method set forth in claim 16 wherein said acoustic pulse is generated substantially in the 0–80 Hz frequency band.

* * * * *